(12) United States Patent
Schauer et al.

(10) Patent No.: US 7,082,557 B2
(45) Date of Patent: Jul. 25, 2006

(54) HIGH SPEED SERIAL INTERFACE TEST

(75) Inventors: Steven Schauer, Loveland, CO (US); Kevin Campbell, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 463 days.

(21) Appl. No.: 10/457,850

(22) Filed: Jun. 9, 2003

(65) Prior Publication Data

US 2004/0250187 A1    Dec. 9, 2004

(51) Int. Cl.
*G01R 31/28*    (2006.01)

(52) U.S. Cl. .................. 714/716; 714/728; 714/30; 370/224; 370/247; 375/221

(58) Field of Classification Search .................... None
See application file for complete search history.

(56) References Cited

U.S. PATENT DOCUMENTS

| | | | | |
|---|---|---|---|---|
| 4,449,247 A * | 5/1984 | Waschka, Jr. | ................. | 455/9 |
| 5,031,129 A * | 7/1991 | Powell et al. | ................ | 708/253 |
| 5,539,733 A * | 7/1996 | Anderson et al. | ............ | 370/362 |
| 6,542,538 B1 * | 4/2003 | Fischel et al. | .............. | 375/224 |
| 6,961,348 B1 * | 11/2005 | Yu | .............................. | 370/466 |
| 7,007,212 B1 * | 2/2006 | Komatsu et al. | ............ | 714/724 |
| 2001/0043603 A1 * | 11/2001 | Yu | .............................. | 370/393 |
| 2003/0131297 A1 * | 7/2003 | Fischel et al. | .............. | 714/728 |
| 2004/0030968 A1 * | 2/2004 | Fan et al. | .................... | 714/704 |
| 2004/0068683 A1 * | 4/2004 | Hoang et al. | ................ | 714/716 |

* cited by examiner

*Primary Examiner*—Albert Decady
*Assistant Examiner*—John P. Trimmings
(74) *Attorney, Agent, or Firm*—William W. Cochran LLC

(57) ABSTRACT

A high speed, two-way serial interface with a scrambler and de-scrambler may be tested by sending a single word repeatedly through the scrambler to create a pseudo-random sequence. The pseudo-random sequence is then passed through the transmitter and looped back through the receiver of the serial interface. The pseudo-random sequence is then descrambled and compared to the input word. Since the input sequence is only a single word rather than a series of words, the comparison is very simple and capable of being performed within the serial interface itself without the need for external test equipment.

10 Claims, 3 Drawing Sheets

HIGH SPEED SERIAL INTERFACE TEST

BACKGROUND OF THE INVENTION a. Field of the Invention

The present invention pertains to communication devices and specifically to serial communications devices with scramblers and de-scramblers.

b. Description of the Background

High speed serial communications protocols are operating at higher and higher speeds. It may become very difficult for test equipment to effectively test a serial communications device when the device is operating at full speed for a number of reasons, including the difficulty of providing an input stream and analyzing the stream at a speed that approaches the normal operating speed of the serial interface.

In order to test a device, it is sometimes preferred to send a seemingly random sequence of characters. In order for a test to be duplicated, it is sometimes preferred that the seemingly random sequence of characters be repeatable. The conflicting requirements of randomness plus being repeatable pose some problems to the testing engineer. One solution is to prepare a predetermined random sequence of characters that may be sequentially sent over the interface. In such a solution, a large amount of data may need to be accessed, transferred, and analyzed in order to exercise a serial interface.

It would be advantageous to provide a system and method for testing a serial interface wherein a repeatable, yet apparently random sequence of information may be passed across the serial interface in a simple and easy fashion. It would be further advantageous to provide a system and method for testing an interface wherein an apparently random sequence is transferred and compared at the full speed of the interface with as little instrumentation as necessary.

SUMMARY OF THE INVENTION

The present invention overcomes the disadvantages and limitations of the prior art by providing a system and method for testing a high speed, two-way serial interface using a series of pseudo-random characters that is generated by a portion of the serial interface itself. First, an input word is stored in a register. The input word is then repeatedly input into a scrambler that creates a pseudo-random number from the input word. The pseudo-random number is encoded and sent to a transceiver wherein the pseudo-random number is looped back through a decoder and a de-scrambler. The resultant word is compared to the input word to determine if an error has occurred in the transmission. The testing may occur at the full speed of the interface and the interface itself may have the capability of comparing the sent and received words without employing external test equipment. In some embodiments, two or more input words may be stored in various registers and sequentially or separately sent through the interface. Various portions of the serial interface may be turned on and off to facilitate debugging and testing of the interface.

The present invention may therefore comprise a method of testing a serial interface comprising: storing an output word into a first register; creating an output stream by repeatedly recalling the output word from the first register; passing the output stream through a scrambler to create a first pseudo-random sequence within the output stream; passing the output stream through a transmitter; looping the output stream back into a receiver; passing the output stream through a descrambler to descramble the first pseudo-random sequence within the output stream to generate multiple input words; comparing each of the multiple input words to the output word in the first register to determine any errors; storing the errors into an error register; and evaluating the performance of the serial interface by at least in part evaluating the errors in the error register.

The present invention may further comprise a serial interface with internal testing comprising: a register capable of storing an output word; a sequencer capable of recalling the output word from the register to create an output stream; a scrambler capable of receiving the output stream and scrambling the output stream to create a pseudo-random sequence within the output stream; a transmitter capable of transmitting the output stream on an output line; a receiver capable of receiving the output stream on an input line; a loop back path capable of switching the output line to the input line such that the transmitter and the receiver are in communication; a descrambler capable of receiving the output stream and descrambling the pseudo-random sequence to generate multiple input words; and a comparator capable of comparing each of the multiple input words with the output word stored in the register, the comparator further capable of detecting an error if one of the input words is not the same as the output word and logging the error.

The advantages of the present invention are that high speed testing of complex serial interfaces may be performed with no external test equipment or external sources of data. Because no external test equipment is required, no performance degradation or other adverse effects prohibit full speed operation of the interface.

DETAILED DESCRIPTION

Figure 1:
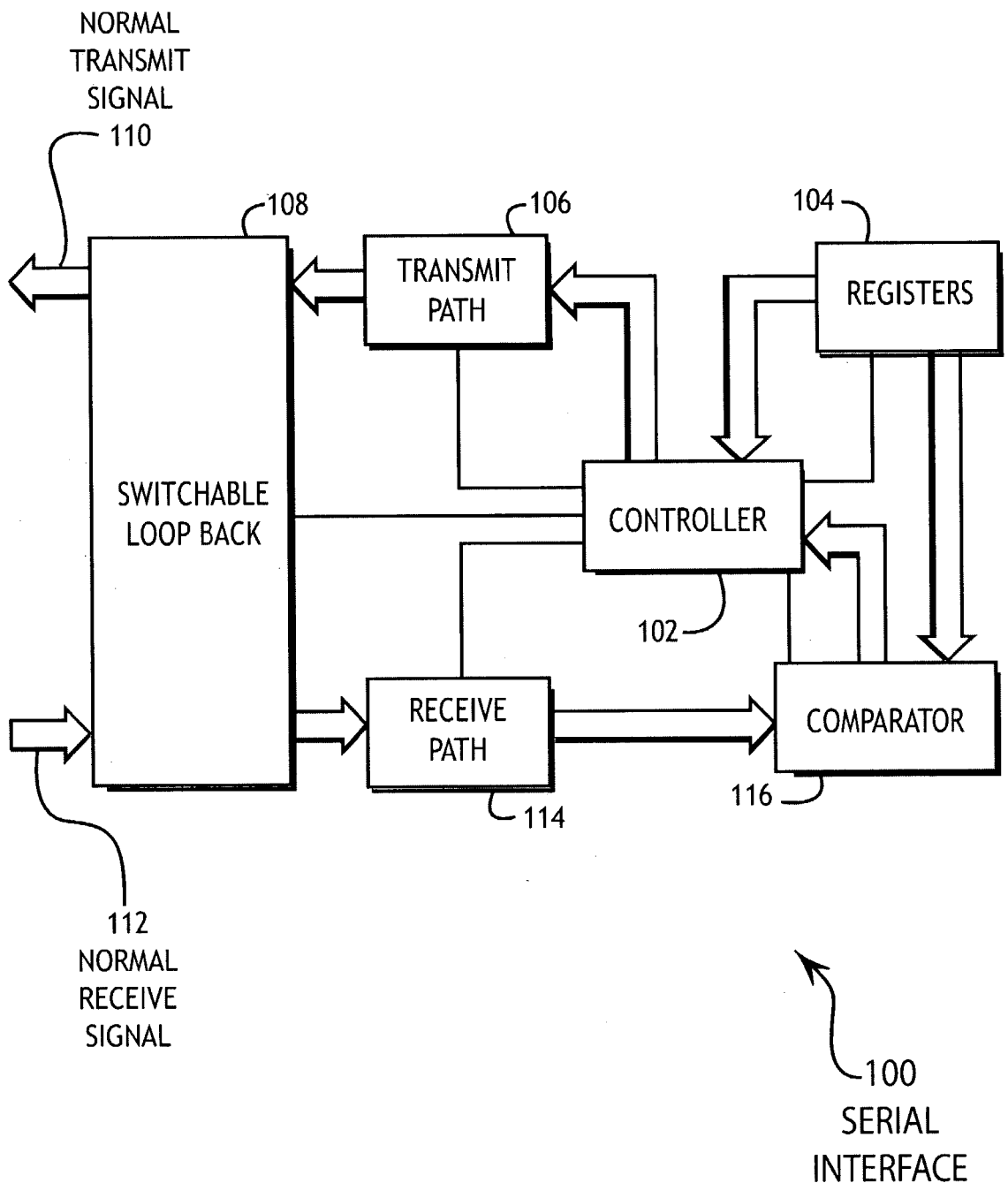
FIG. 1 is an illustration of an embodiment of the present invention showing a serial interface with a built in self-test.

FIG. 1 illustrates an embodiment 100 of the present invention showing a serial interface with a built-in self-test apparatus. A controller 102 communicates with a set of registers 104 to retrieve a word or set of words. The controller 102 may send those words repeatedly through a transmit path 106, a switchable loopback path 108, and a receive path 114 to a comparator 116. The comparator 116 may compare the received series of words with the initial words found in the registers 104.

The embodiment 100 enables a repeated set of words to exercise all of the transmit and receive portions of the interface at the highest speed possible because no external test equipment is required. Typically, the exercising of an interface may require a long string of data that is supplied at one end of the interface and transmitted through the interface. The present invention only uses a series of repeated words that are stored in the register 104, thus severely eliminating the amount of data required to exercise the interface and making the comparator 116 much simpler. Some standardized serial interfaces, such as Serial ATA and Serial Attached SCSI have an internal scrambler and descrambler capability. In such interfaces, the transmitted stream undergoes a polynomial scrambling algorithm that is synchronized with a descrambler on the receiving end. One benefit of such a scramble/descramble system is that repeated data may not cause resonance or other noise problems when transmitted.

In the present embodiment, the scrambler/descrambler system may allow a pseudo-random data stream to be generated from a simple input that is repeated. The pseudo-random data stream has the benefit that it is repeatable in that the same data stream may be repeated to duplicate a previous test, for example. Further, the descrambled data is merely a repeated word that should be identical to the input word stored in the register 104. This allows the comparator 116 to be a very simple operation.

Figure 2:
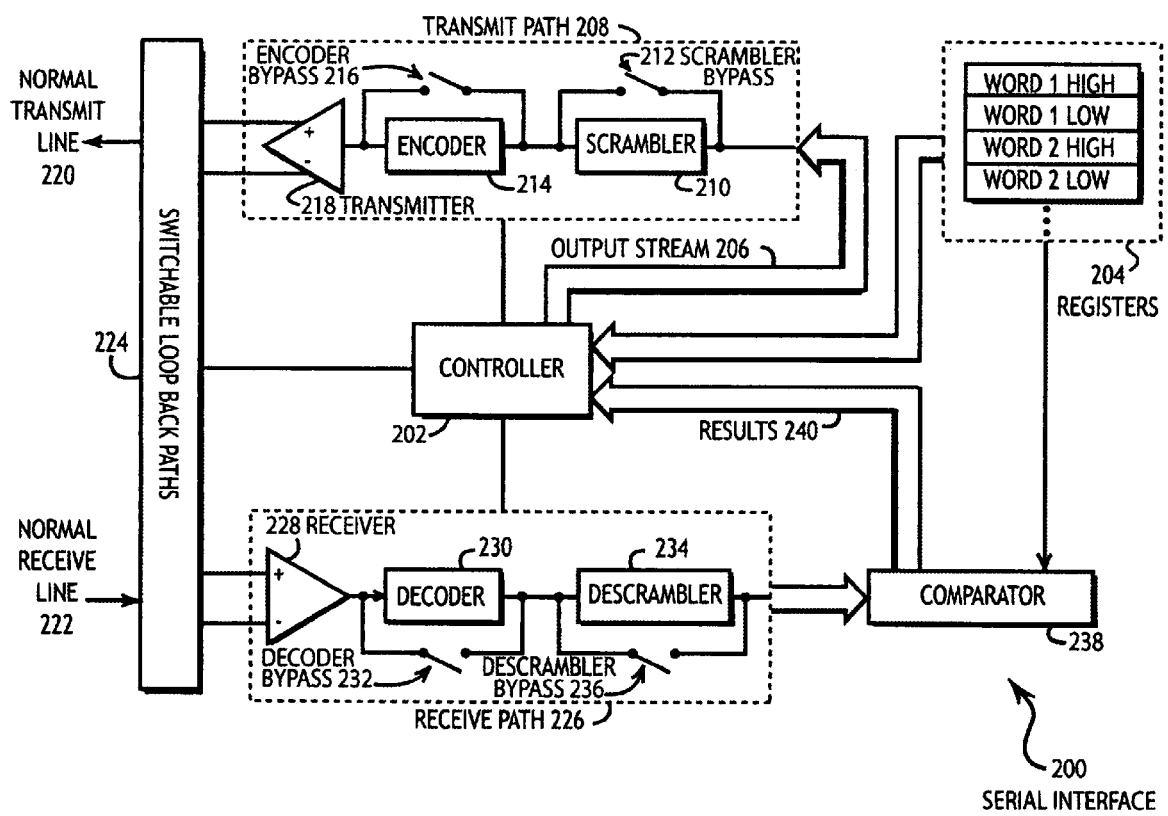
FIG. 2 is an illustration of an embodiment of the present invention showing a serial interface with a built in self test, with more detail than in FIG. 1.

FIG. 2 illustrates a more detailed embodiment 200 of the present invention showing a serial interface with a built in self test. A controller 202 communicates with the registers 204 to receive a word or set of words to create a repeating output stream 206. The output stream 206 is fed into the transmit path 208 that is composed of a scrambler 210 with a scrambler bypass 212, an encoder 214 and an encoder bypass 216, and a transmitter 218. The output signal passes through a switched loopback path 224 or may optionally be sent via the normal transmit line 220 and received via the normal receive line 222. The switched loopback path 224 sends the transmitted signal back into the receive path 226 of the serial interface 200. The receive path 226 is comprised of a receiver 228, a decoder 230 and a decoder bypass 232, a descrambler 234 and a descrambler bypass 236. The resultant signal is passed through a comparator 238 that compares the incoming, decoded signal with the words contained in the registers 204. The results 240 of the comparator may be read by the controller 202.

The embodiment 200 may use the function of the scrambler 210 and descrambler 234 to create a pseudo-random sequence of data that may be sent out the transmit path 208 and received by the receive path 226 at the full speed of the interface 200. In this manner, each component that may be necessary to transmit and receive data may be fully exercised and thereby tested. Various bypass switches 212, 216, 232, and 236 allow some functionality to be switched in and out of the device to aid troubleshooting.

In some embodiments, the circuitry for the serial interface 200 may be constructed on a single integrated circuit chip. In such an embodiment, the switched loopback paths 224 may be switchable circuits within the chip that allow the chip to perform a self test without any external signal paths. In other embodiments, the switched loopback paths 224 may be an external loopback that is mechanically attached to a device such as a computer or peripheral device for the purposes of performing a loopback test. In other embodiments, the switched loopback paths 224 may be implemented as an electronically switchable path that is implemented on a printed circuit board. Those skilled in the arts of electronics will appreciate that various methods for looping back the transmit signals into the receive signals may be implemented while keeping within the spirit and intent of the present invention.

The scrambler 210 and descrambler 234 may be synchronized by sending a primitive or other command from the transmit path 208 to the receive path 226. The primitive may cause both the scrambler 210 and descrambler 234 to synchronize such that the scrambled output signals may be correctly descrambled when received. Further, the primitive may allow the encoder 214 and decoder 230 to similarly synchronize.

After synchronizing, the scrambler 210 may be fed an output stream 206 that consists of repeated words contained in the registers 204. The scrambler 210, using any type of algorithm, may then create a sequence of data that does not repeat with the same frequency as the input stream. For example, the scrambler 210 may multiply the input word by a number that is generated by a polynomial expression wherein the input to the polynomial is incremented for each new word. In such a manner, the input word is changed into an output stream that does not have a very high frequency of repetition. For the purposes of a self test, however, the series is a pseudo-random sequence and affords the testing engineer the opportunity to subject the serial interface 200 to a thorough test.

When the signal successfully passes through the serial interface 200 with the loopback enabled, the output stream is a repeating sequence of the input words stored in the register 204. The comparator 238 is only required to compare each received word with the transmitted word and does not necessarily need the ability to compare two long streams of data, as may be needed by other forms of testing the serial interface 200. In this manner, the comparator 238 may be significantly more simple than would be required for other forms of testing while providing a much more complex and robust testing method.

The controller 202 may be capable of sending several different words from the registers 204. In some embodiments, the controller 202 may be capable of sending the various words from the registers 204 in sequence. For example, a single word may be repeated over and over in one test. Four words may be sent in sequence and then the four word sequence may be repeated over and over in another test. The number of words used as a base sequence for the output stream 206 may be limited by the amount of storage in the registers 204 and the capability of the comparator 238 to perform the analysis.

The results 240 may be sent to the controller 202 in several different forms. In one case, the comparator 238 may transmit a pass or fail signal for each word that is analyzed. In another case, the comparator 238 may transmit only a fail signal when an error occurs. In still another case, the comparator 238 may transmit the entire failed word. Different forms of the output results 240 may be created by those skilled in the arts based on the specific methods of analysis, personal preferences, or other requirements while keeping within the spirit and intent of the present invention.

Figure 3:
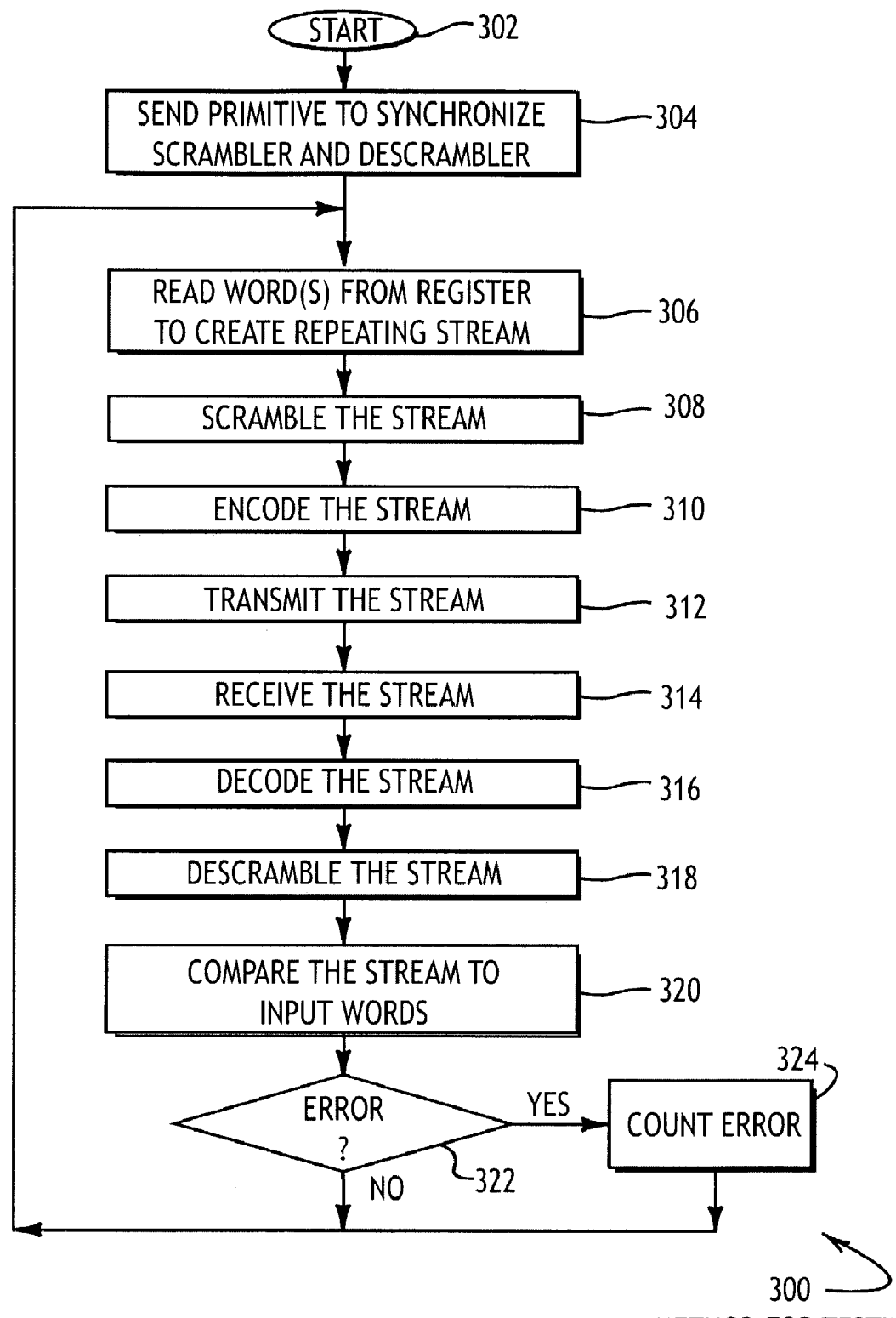
FIG. 3 is an illustration of an embodiment of the present invention showing a method for testing a serial interface.

FIG. 3 illustrates an embodiment 300 of the present invention showing a method for testing a serial interface. The process begins in block 302. A primitive is sent between the scrambler and descrambler to synchronize those elements in block 304. Words are read from the register and a repeating stream is created in block 306. The stream is scrambled in block 308 and encoded in block 310 before being transmitted in block 312 and received in block 314. The received stream is decoded in block 316 and descrambled in block 318. The descrambled output stream is compared to the repeated input words in block 320. If an error occurred in block 322, the error is counted in block 324 and the process repeats in block 306.

The embodiment 300 illustrates a method wherein a pseudo-random testing sequence may be generated by using only one or more words stored in a register. The words are used to create a scrambled and encoded output that is pseudo-random and may thereby more fully exercise the serial interface at full speed. Not only are the transmit and receive functions of the interface are tested at full speed, but the scrambler and descrambler, and the encoder and decoder portions of the interface are tested at full speed.

In some embodiments, the steps of encoding and decoding the stream may not be included or may be switched out of the process. For serial interfaces where a standardized encoding and decoding scheme is not used, such processing would not necessarily be implemented. In other embodiments, the encoding and decoding portions of the process may be temporarily switched off for troubleshooting or other testing that may be desired.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of testing a serial interface comprising:
   storing an output word into a first register;
   creating an output stream by repeatedly recalling said output word from said first register;
   passing said output stream through a scrambler to create a first pseudo-random sequence within said output stream;
   passing said output stream through a transmitter;
   looping said output stream back into a receiver;
   passing said output stream through a descrambler to descramble said first pseudo-random sequence within said output stream to generate multiple input words;
   comparing each of said multiple input words to said output word in said first register to determine any errors;
   storing said errors into an error register; and
   evaluating the performance of said serial interface by at least in part evaluating said errors in said error register.

2. The method of claim 1 further comprising:
   passing said first pseudo-random output stream through an encoder to encode said output stream; and
   passing said first pseudo-random output stream through a decoder to decode said output stream.

3. The method of claim 1 further comprising:
   sending a start sequence from said scrambler to said descrambler, wherein said descrambler is adapted to receive said start sequence and is capable of synchronizing with said scrambler based on said start sequence.

4. The method of claim 1 further comprising:
   setting said scrambler into a bypass mode wherein said pseudo-random sequence is not created within said output stream; and
   setting said descrambler into a bypass mode wherein said pseudo-random sequence is not descrambled within said output stream.

5. The method of claim 2 further comprising:
   setting said encoder into a bypass mode wherein said output stream is not encoded; and
   setting said decoder into a bypass mode wherein said output stream is not decoded.

6. A serial interface with internal testing comprising:
   a register for storing an output word;
   a sequencer for recalling said output word from said register to create an output stream;
   a scrambler for receiving said output stream and scrambling said output stream to create a pseudo-random sequence within said output stream;
   a transmitter for transmitting said output stream on an output line;
   a receiver for receiving said output stream on an input line;
   a loop back path for switching said output line to said input line such that said transmitter and said receiver are in communication;
   a descrambler for receiving said output stream and descrambling said pseudo-random sequence to generate multiple input words; and
   a comparator for comparing each of said multiple input words with said output word stored in said register, said comparator detecting an error if one of said input words is not the same as said output word and logging said error.

7. The serial interface of claim 6 further comprising:
   an encoder for receiving said output stream and encoding said output stream; and
   a decoder for receiving said output stream and decoding said output stream.

8. The serial interface of claim 6 wherein said descrambler is adapted to receive a start sequence and synchronize with said scrambler based on said start sequence.

9. The serial interface of claim 6 wherein:
   said scrambler comprises a bypass mode wherein said pseudo-random sequence is not created within said output stream; and
   said descrambler of comprises a bypass mode wherein said pseudo-random sequence is not descrambled within said output stream.

10. The serial interface of claim 7 wherein:
    said encoder comprises a bypass mode wherein said output stream is not encoded; and
    said decoder comprises a bypass mode wherein said output stream is not decoded.

* * * * *